Nov. 28, 1939.   J. H. GRAYSON   2,181,809
THERMOSTATIC CONTROL DEVICE
Original Filed Sept. 29, 1936
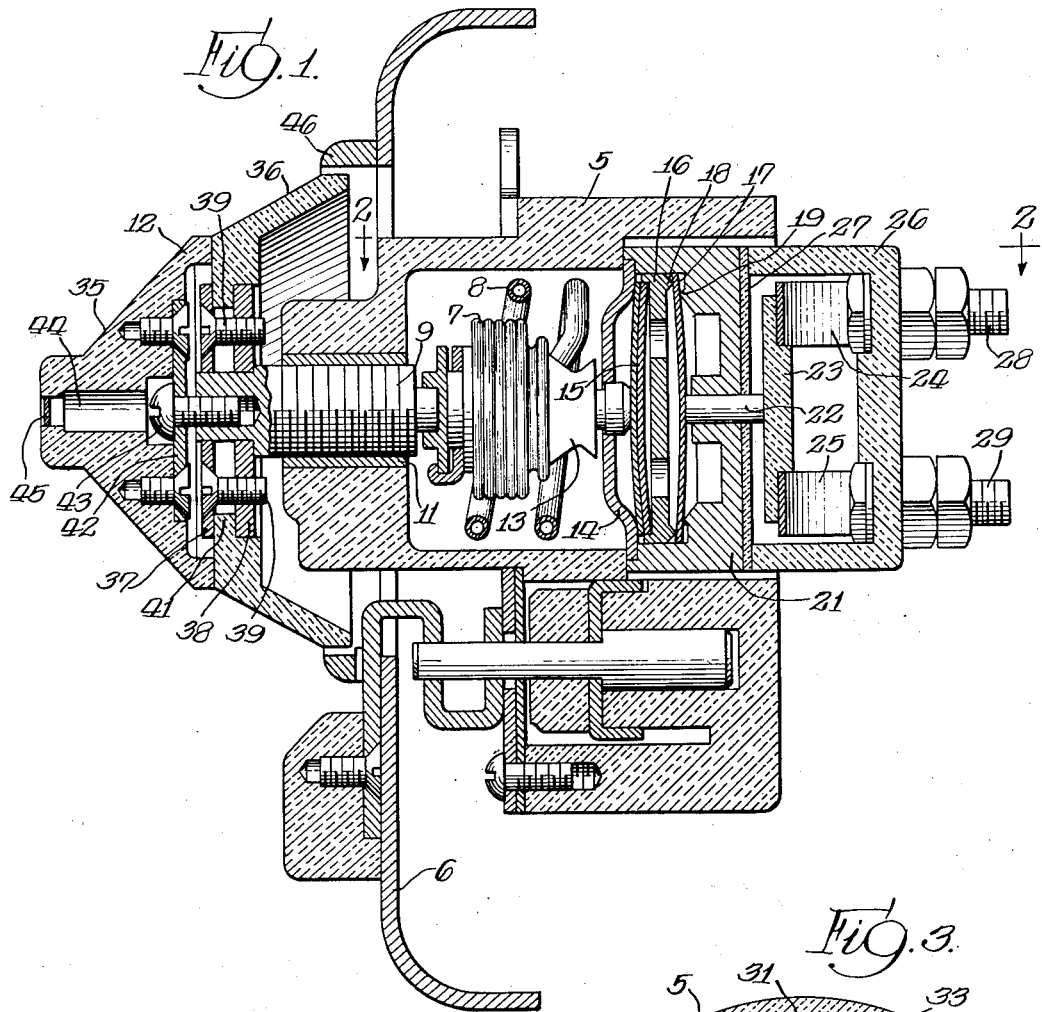
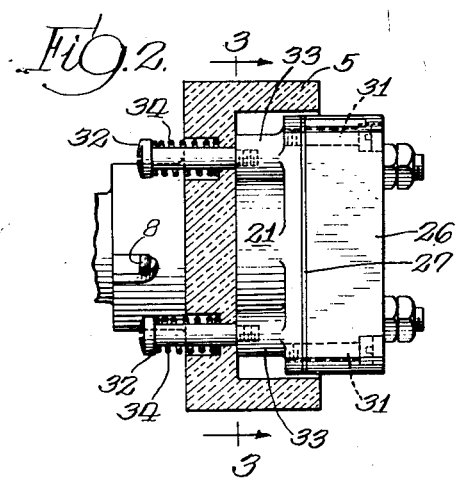
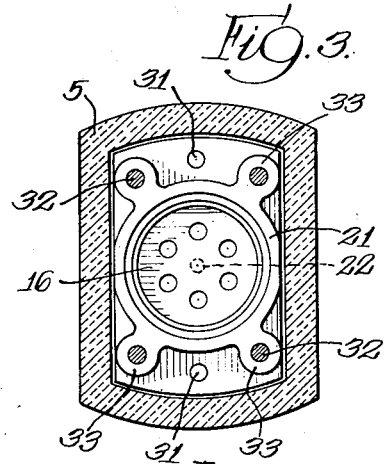
Inventor
John H Grayson
By [signature] Atty.

Patented Nov. 28, 1939

2,181,809

UNITED STATES PATENT OFFICE 2,181,809

THERMOSTATIC CONTROL DEVICE

John H. Grayson, Lynwood, Calif., assignor to Grayson Heat Control, Ltd., Lynwood, Calif., a corporation of California Original application September 29, 1936, Serial No. 103,160. Divided and this application October 7, 1937, Serial No. 167,792

3 Claims. (Cl. 200—140)

This invention relates to control devices generally including thermostats of the type particularly adapted for controlling the heat of an oven, and this application is a division of application Serial No. 103,160, filed September 29, 1936, for Electric stove control apparatus.

A thermostat of the character here disclosed is designed to control the temperature of an electrically heated oven such as a household baking oven by opening a switch in the heating circuit when the oven temperature reaches a predetermined point for which the thermostat is set and for closing said switch when the oven temperature falls below that point.

A snap action mechanism is embodied in the thermostat for actuating the contact members of the switch, and my present invention is concerned chiefly with a safety device which obviates the imposition by the thermostat proper of excessive strains upon the snap action mechanism which, if permitted to be exerted, might permanently distort or otherwise injure this mechanism.

Another feature of my invention resides in the novel construction of the operating or adjusting knob and its connection to the adjustable thermostat post which construction permits adjustment of the knob relatively to the post so as to insure a correspondence between the oven temperature and the indicating position of the indicia on the knob.

Other advantageous features of the invention will be readily appreciated as the same becomes better understood by reference to the following description when considered in connection with the accompanying drawing.

Referring to the drawing,

Fig. 1 is a longitudinal sectional view of a thermostat embodying my invention;

Fig. 2 is a fragmentary sectional view on the line 2—2 of Fig. 1;

Fig. 3 is a sectional view on the line 3—3 of Fig. 2.

The thermostatic switch as illustrated comprises a body 5 adapted to be mounted in the front panel 6 of an electric stove, a thermostatic bellows 7 being disposed within the body and connected by a small tube 8 with a bulb position within the oven. The bulb, tube, and bellows are filled with an expansible liquid which produces elongation of the bellows upon expansion of the liquid under influence of oven heat.

The bellows at one end abuts against a post 9, threaded through a sleeve 11, fixed in the body 5. A knob 12 is adjustably attached to the outer end of the post by a novel construction which will be later described. The other end of the bellows 8 is supported, through a guide and thrust post 13 rigidly connected to the bellows, from a disk-like guide member 14 through which the post projects into abutting relation with a bi-metallic thermostatic member 15 adapted to compensate for local temperature variations in a well-known manner. The thrust of the post is transmitted through this member to a thrust member 16 against the peripheral margin of a clicker disk 17 interposed between a circumferential rib 18 on the thrust member and a rib 19 of smaller diameter than the thrust member rib and formed on the casing member 21.

Clicker disk 17 is normally biased into the concavo-convex position shown in Fig. 1 to exert a thrust against a post 22 which bears against a bar 23 made of insulating material and attached to the resilient switch members 24 and 25 which are adapted to close the main line circuit.

These switch members are mounted in an insulating casing 26 and are also insulated from the casing member 21 by an insulating disk 27. One end of switch member 24 is anchored to a binding post 28, and the corresponding end of switch member 25 is similarly anchored to a binding post 29. The companion contact members with which the switch members are adapted to contact to close the heating circuit are not here shown, as they are unnecessary for an understanding of the invention. It is sufficient to state that the switch is opened by expansion of the thermostatic bellows sufficiently to throw the clicker disk into a position reverse to that shown in Fig. 1 and permit the resiliency of members 24 and 25 to separate the contacts. Upon contraction of the bellows sufficiently to permit the clicker disk to assume its normal position shown in Fig. 1, the switch members are flexed to close the contacts.

Adjustment of the knob 12 to off position threads the post line inwardly to its extreme position, thereby reversing the position of the disk 17 illustrated in Fig. 1 and opens the switch. A turn of the knob in a clockwise direction any amount desired to bring the desired temperature indicia on the knob uppermost will correspondingly retract the post outwardly in its sleeve, thereby relieving the pressure on the bellows so as to permit the clicker disk to assume the position shown in Fig. 1, thereby closing the switch members 24 and 25 against their contacts. When the oven temperature indicated by the selected indicia has been reached, the bellows under the influence of the generated heat from the oven will have expanded sufficiently at that temperature to reverse the clicker disk and open the switches, thus shutting off the heat.

For the purpose of precluding injury to the parts of the mechanism operated by the bellows which might result from the excessive pressure produced by turning the knob to off position at a time when the oven temperature is high and the bellows is fully expanded, compensation for this excessive pressure is afforded by a pressure-relief device which will now be explained.

The switch casing 26 and the clicker disk housing 21 are rigidly connected by screws 31 to form a rigid housing for the switch and the operating elements interposed between the bellows and the switch. This housing is connected to the main housing 5 by screw posts 32 threaded at their inner ends into bosses 33 formed on the member 21 and extending through the wall of the housing 5.

Surrounding these screw posts and interposed between the heads thereof and the housing 5 are coiled springs 34 which permit the housing containing the operating mechanisms to move bodily toward the right viewing Figs. 1 and 2 relatively to housing 5 under the thrust exerted by the bellows. When, therefore, the exerted thrust of the bellows becomes sufficiently greater than required to operate the clicker disk as to be liable to cause injury to the parts, these springs 34 will yield permitting the housing comprising the casings 21 and 26 to move bodily away from housing 5, thereby relieving the excess pressure so as to protect the mechanisms.

It will be understood, of course, that during normal operation the clicker disk will be actuated by bellows in accordance with the setting of the knob, and during such normal operation the springs 39 will not yield. When, however, the current is suddenly turned off by rotating the knob to off position, if the bellows at such time is fully or substantially fully expanded, the pressure exerted by the inward movement of the post 9 against the bellows will be absorbed by the springs 34 so as to effectively preclude injury to the operating parts of the apparatus.

It will be manifest, therefore, that I have provided a thermostatic switch control in which the operating parts are completely enclosed and protected against damage from external forces and that they are adequately protected against injury from excessive strains induced by shutting off the device when the bellows is substantially expanded. The protective feature incorporated in the casing structure which permits relative movement between connected portions of the casing enables an inflexible connection to be employed between the knob and the bellows for adjustment and regulation purposes which insures a nicety of adjustment and consequent extreme accuracy of temperature control.

In order that the knob 12 may be capable of adjustment relatively to the post 9 for the purpose of insuring a correspondence between the oven temperatures and the indicating position of the indicia on the knob, an adjustable connection between the knob and post is provided as illustrated in Fig. 1.

The knob as shown comprises two sections designated 35 and 36 respectively, the latter of which has a central hub composed of two plates 37 and 38 which fit over the polygonal outer end of the post 9 and are drawn together by screws 39 to clamp between them the inwardly extending flange 41 of the knob section.

The knob section 36 is held against displacement from the post by the outer section 35 comprising a plate 42 through which a screw 43 projects into a tapped bore in the post. This screw may be unthreaded from the post by means of a screw driver inserted through a central bore 44 in the knob section to which access may be had by removal of the spring retained ornamental closure member 45. Disconnection of the section 35 affords access to the clamping screws 39 which when loosened release the section 36 from its hub plates so that the requisite adjustment of this section relatively to the post may be made. The section 36 is provided on its inclined circumference with indicia adapted to be brought by the turning of the knob into registration with an indicator 46 upon the panel 6.

It should be manifest that this provision for adjustment enables the graduated knob to be set on the post in such position that the oven temperature at which the thermostatic bellows will open the switch will be correctly shown by the indicating position of the corresponding indicia on the knob.

While I have shown and described a preferred embodiment of my invention, obviously, the structural details disclosed for illustrative purposes may be modified within considerable limits within the purview of my invention as defined in the following claims.

I claim:

1. In a thermostatic device, the combination of a thermostat, an element to be operated, operative connections between said thermostat and said element, a threaded rotatable post for regulating operation of the element, a graduated sectional knob by which said post may be manually adjusted, an adjustable connection between one section of said knob and said post including a pair of disks rotatable with the post, means for frictionally clamping said section of the knob between said disks, said means being releasable to permit adjustment of said section relatively to the post, and means connecting the other knob section to the post for securing said knob as a whole on said post.

2. A control apparatus comprising a thermostatically operable member, a regulating post therefor, a sectional knob by which said post may be adjusted, a hub comprising a pair of disks non-rotatably mounted on the post, one of said knob sections being releasably clamped between said disks and the other knob section enclosing said hub and engaging said first section, and means connecting said other section to said post for securing both of said knob sections to said post.

3. In a thermostatic device, the combination of a housing comprising a plurality of telescopic sections, a thermostatic element mounted in one of said sections, a switch and operative connections between said switch and said thermostatic element mounted on the other of said sections, and means for yieldably maintaining said sections in assembled relation but permitting separation thereof under the action of said thermostatic element to thereby protect said operative connections against injury.

JOHN H. GRAYSON.